United States Patent
Popovich et al.

(10) Patent No.: US 6,507,419 B1
(45) Date of Patent: Jan. 14, 2003

(54) ILLUMINATION SYSTEM USING OPTICAL FEEDBACK

(75) Inventors: Milan M. Popovich, Leicester (GB); John J. Storey, Wollaton (GB); Michael R. Adams, Saltby Melton Mowbray (GB); C. David Nabors, Sunnyvale, CA (US); Jonathan D. Waldern, Los Altos Hills, CA (US)

(73) Assignee: DigiLens, Inc., Sunnyvale, CA (US)

( * ) Notice: Subject to any disclaimer, the term of this patent is extended or adjusted under 35 U.S.C. 154(b) by 0 days.

(21) Appl. No.: 09/533,608

(22) Filed: Mar. 23, 2000

Related U.S. Application Data
(60) Provisional application No. 60/125,926, filed on Mar. 23, 1999.

(51) Int. Cl.[7] .................................................. G02B 5/32
(52) U.S. Cl. .............................. 359/15; 359/3; 359/24; 359/562; 359/567; 359/568; 359/576
(58) Field of Search ................................ 359/4, 5, 6, 7, 359/15, 24, 562, 566, 567, 568, 576

(56) References Cited

U.S. PATENT DOCUMENTS

| | | |
|---|---|---|
| 3,807,829 A | 4/1974 | Close |
| 4,028,725 A | 6/1977 | Lewis ........................ 358/103 |
| 4,458,981 A | 7/1984 | Huignard |
| 4,500,163 A | 2/1985 | Burns et al. |
| 4,566,031 A | 1/1986 | Kirk |

(List continued on next page.)

FOREIGN PATENT DOCUMENTS

| | | | |
|---|---|---|---|
| DE | 34 19 098 A1 | 11/1985 | ............ G02B/27/22 |
| EP | 0 389 123 A2 | 9/1990 | ............ G03B/21/56 |
| EP | 0 389 123 A3 | 9/1990 | ............ G03B/21/56 |
| EP | 0 559 435 A1 | 9/1993 | ............ G11B/7/135 |
| EP | 0 602 813 A1 | 6/1994 | ............ D02B/5/32 |

(List continued on next page.)

OTHER PUBLICATIONS

Bunning, T.J. et al., "The Morphology and Performance of Holographic Transmission Gratings Recorded in Polymer Dispersed Liquid Crystals," Polymer vol. 36, No. 14, received Dec. 27, 1994; revised Feb. 10, 1995, pp. 2699–2708.

Domash, Lawrence H. et al., "Applications of Switchable Polaroid Holograms," SPIE vol. 2152, Jun. 1, 1994, pp. 127–138.

(List continued on next page.)

Primary Examiner—Cassandra Spyrou
Assistant Examiner—Leo Boutsikaris
(74) Attorney, Agent, or Firm—Campbell Stephenson Ascolese LLP (57) ABSTRACT

Disclosed is an illumination system using optical feedback to maintain a predetermined illumination output. The illumination system employs an electrically controllable optical filter for filtering light incident thereon. The illumination system also includes a light detector for detecting at least a portion of the light filtered by the electrically controllable optical filter. The light detector is in data communication with the electrically controllable optical filter. Some or all light filtered by the electrically controllable optical filter is detected by the light detector, which, in turn generates a corresponding signal that is compared to at least one predetermined value. If the signal generated by the light detector differs when compared to the at least one predetermined value, one or more filtering characteristics of electrically controllable optical filter are varied which, in turn, varies the amount of light filtered by the electrically controllable optical filter. The filtering characteristics of the electrically controllable optical filter continue to be varied until the signal generated by the light etector substantially matches the at least one predetermined value.

30 Claims, 5 Drawing Sheets

U.S. PATENT DOCUMENTS

| | | |
|---|---|---|
| 4,669,812 A | 6/1987 | Hoebing |
| 4,759,596 A | 7/1988 | Po et al. |
| 4,790,613 A | 12/1988 | Moss |
| 4,799,739 A | 1/1989 | Newswanger |
| 4,807,951 A | 2/1989 | Moss |
| 4,830,441 A | 5/1989 | Chang |
| 4,834,473 A | 5/1989 | Keyes, IV et al. |
| 4,834,476 A | 5/1989 | Benton |
| H738 H | 2/1990 | McManus et al. |
| 4,932,731 A | 6/1990 | Suzuki et al. |
| 4,938,568 A | 7/1990 | Margerum et al. ........... 350/334 |
| 4,981,332 A | 1/1991 | Smith et al. |
| 4,993,790 A | 2/1991 | Vick |
| 5,011,244 A | 4/1991 | Smith et al. |
| 5,013,141 A | 5/1991 | Sakata ........................ 350/348 |
| 5,014,709 A | 5/1991 | Bjelkhagen et al. |
| 5,024,494 A | 6/1991 | Williams et al. |
| 5,035,474 A | 7/1991 | Moss |
| 5,036,385 A | 7/1991 | Eichenlaub et al. |
| 5,044,709 A | 9/1991 | Smith et al. |
| 5,071,209 A | 12/1991 | Chang |
| 5,093,563 A | 3/1992 | Small et al. |
| 5,093,567 A | 3/1992 | Staveley ..................... 250/221 |
| 5,096,282 A | 3/1992 | Margerum et al. .............. 359/3 |
| 5,103,323 A | 4/1992 | Magarinos |
| 5,111,313 A | 5/1992 | Shires |
| 5,151,724 A | 9/1992 | Kikinis |
| 5,153,670 A | 10/1992 | Jannson et al. |
| 5,175,637 A | 12/1992 | Jones et al. .................... 359/48 |
| 5,221,957 A | 6/1993 | Jannson et al. |
| 5,227,898 A | 7/1993 | Iavecchia et al. |
| 5,234,449 A | 8/1993 | Bruker ........................ 606/158 |
| 5,278,532 A | 1/1994 | Hegg et al. |
| 5,291,314 A | 3/1994 | Agranat et al. |
| 5,299,035 A | 3/1994 | Leith et al. |
| 5,305,124 A | 4/1994 | Chern et al. |
| 5,319,492 A | 6/1994 | Dorn et al. |
| 5,331,149 A | 7/1994 | Spitzer et al. .............. 250/221 |
| 5,341,229 A | 8/1994 | Rowan |
| 5,365,354 A | 11/1994 | Jannson et al. |
| 5,379,133 A | 1/1995 | Kirk |
| 5,381,253 A | 1/1995 | Sharp et al. |
| 5,414,544 A | 5/1995 | Aoyagi et al. ................ 359/53 |
| 5,418,631 A | 5/1995 | Tedesco et al. |
| 5,424,866 A | 6/1995 | Kikinis |
| 5,440,428 A | 8/1995 | Hegg et al. |
| 5,455,693 A | 10/1995 | Wreede et al. ................ 359/15 |
| 5,471,327 A | 11/1995 | Tedesco et al. |
| 5,497,254 A | 3/1996 | Amako et al. |
| 5,506,701 A | 4/1996 | Ichikawa |
| 5,521,724 A | 5/1996 | Shires |
| 5,530,565 A | 6/1996 | Owen |
| 5,535,024 A | 7/1996 | Khoury et al. |
| 5,537,232 A | 7/1996 | Biles |
| 5,539,542 A | 7/1996 | Picoli et al. |
| 5,539,544 A | 7/1996 | Le Paih et al. |
| 5,544,143 A | 8/1996 | Kay et al. |
| 5,552,912 A | 9/1996 | Sharp et al. |
| 5,552,916 A | 9/1996 | O'Callaghan et al. |
| 5,557,283 A | 9/1996 | Sheen et al. |
| 5,561,537 A | 10/1996 | Aritake et al. |
| 5,568,313 A | 10/1996 | Steenblick |
| 5,570,139 A | 10/1996 | Wang |
| 5,570,208 A | 10/1996 | Kato et al. |
| 5,579,026 A | 11/1996 | Tabata ........................... 345/8 |
| 5,581,378 A | 12/1996 | Kulick |
| 5,589,956 A | 12/1996 | Morishima et al. ........... 359/15 |
| 5,589,957 A | 12/1996 | Aritake et al. |
| 5,594,560 A | 1/1997 | Jelley et al. |
| 5,606,455 A | 2/1997 | Eichenlaub |
| 5,608,552 A | 3/1997 | Smith ............................. 349/5 |
| 5,615,023 A | 3/1997 | Yang |
| 5,615,186 A | 3/1997 | Rosen et al. |
| 5,617,225 A | 4/1997 | Aritake et al. |
| 5,621,547 A | 4/1997 | Loiseaux et al. |
| 5,629,784 A | 5/1997 | Abileah et al. |
| 5,635,947 A | 6/1997 | Iwamoto ........................ 345/7 |
| 5,640,256 A | 6/1997 | De Vré et al. .................. 359/3 |
| 5,644,369 A | 7/1997 | Jachimowicz et al. ........ 349/10 |
| 5,644,414 A | 7/1997 | Kato et al. |
| 5,650,865 A | 7/1997 | Smith |
| 5,668,648 A | 9/1997 | Saito et al. |
| 5,680,231 A | 10/1997 | Grinberg et al. |
| 5,682,214 A | 10/1997 | Amako et al. ................ 349/74 |
| 5,684,498 A | 11/1997 | Welch et al. ................... 345/8 |
| 5,692,077 A | 11/1997 | Stone et al. |
| 5,696,552 A | 12/1997 | Aritake et al. |
| 5,696,749 A | 12/1997 | Brazas et al. |
| 5,698,343 A | 12/1997 | Sutherland et al. ............ 430/1 |
| 5,703,702 A | 12/1997 | Crane et al. |
| 5,706,067 A | 1/1998 | Colgan et al. |
| 5,708,488 A | 1/1998 | Fukui et al. |
| 5,709,463 A | 1/1998 | Igram |
| 5,717,509 A | 2/1998 | Kato et al. |
| 5,719,690 A | 2/1998 | Burland et al. |
| 5,721,598 A | 2/1998 | Smith |
| 5,721,630 A | 2/1998 | Horner et al. |
| 5,729,366 A | 3/1998 | Yang et al. |
| 5,736,958 A | 4/1998 | Turpin |
| 5,739,930 A | 4/1998 | Sato et al. .................... 359/23 |
| 5,744,267 A | 4/1998 | Meerholz et al. |
| 5,745,203 A | 4/1998 | Valliath et al. |
| 5,748,272 A | 5/1998 | Tanaka et al. ................ 349/86 |
| 5,748,828 A | 5/1998 | Steiner et al. |
| 5,751,243 A | 5/1998 | Turpin |
| 5,751,452 A | 5/1998 | Tanaka et al. ................ 359/52 |
| 5,757,522 A | 5/1998 | Kulick et al. |
| 5,760,933 A | 6/1998 | Aritake et al. |
| 5,764,317 A | 6/1998 | Sadovnik et al. ............... 349/5 |
| 5,768,242 A | 6/1998 | Juday ......................... 369/103 |
| 5,771,320 A | 6/1998 | Stone |
| 5,774,175 A | 6/1998 | Hattori |
| 5,777,742 A | 7/1998 | Marron |
| 5,777,760 A | 7/1998 | Hays et al. |
| 5,784,181 A | 7/1998 | Loiseaux et al. ............... 359/1 |
| 5,790,284 A | 8/1998 | Taniguchi et al. ............ 359/15 |
| 5,793,503 A | 8/1998 | Haines et al. |
| 5,793,504 A | 8/1998 | Stoll |
| 5,796,498 A | 8/1998 | French |
| 5,796,499 A | 8/1998 | Wenyon |
| 5,801,793 A | 9/1998 | Faris et al. |
| 5,801,798 A | 9/1998 | Chen et al. |
| 5,801,799 A | 9/1998 | Chen et al. |
| 5,808,589 A | 9/1998 | Fergason ........................ 345/8 |
| 5,808,759 A | 9/1998 | Okamori et al. |
| 5,808,800 A | 9/1998 | Handschy et al. .......... 359/630 |
| 5,815,222 A | 9/1998 | Matsuda et al. |
| 5,822,029 A | 10/1998 | Davis et al. |
| 5,825,340 A | 10/1998 | Torizuka et al. ............... 345/8 |
| 5,825,448 A | 10/1998 | Bos et al. |
| 5,825,540 A | 10/1998 | Gold et al. |
| 5,828,471 A | 10/1998 | Davis et al. |
| 5,838,403 A | 11/1998 | Jannson et al. |
| 5,844,709 A | 12/1998 | Rabinovich et al. |
| 5,844,711 A | 12/1998 | Harrison |
| 5,852,504 A | 12/1998 | Kato et al. |
| 5,867,134 A | 2/1999 | Alvelda et al. ................. 345/8 |
| 5,875,012 A | 2/1999 | Crawford et al. ............. 349/74 |
| 5,880,883 A | 3/1999 | Sudo ........................... 359/462 |
| 5,886,675 A | 3/1999 | Aye et al. ...................... 345/7 |
| 5,942,157 A | 8/1999 | Sutherland et al. ......... 252/582 |

| | | | | |
|---|---|---|---|---|
| 5,946,114 A | * | 8/1999 | Loiseaux et al. | 359/15 |
| 5,959,704 A | | 9/1999 | Suzuki et al. | 349/9 |
| 5,977,935 A | | 11/1999 | Yasukawa et al. | 345/8 |
| 6,008,781 A | | 12/1999 | Furness, III et al. | 345/8 |
| 6,023,253 A | | 2/2000 | Taniguchi et al. | 345/7 |

FOREIGN PATENT DOCUMENTS

| | | | | |
|---|---|---|---|---|
| EP | 0 664 495 A1 | 7/1995 | | G03H/1/02 |
| EP | 0 720 040 A2 | 7/1996 | | G02F/1/1335 |
| EP | 0 720 040 A3 | 4/1997 | | G02F/1/1335 |
| EP | 0 777 136 A1 | 6/1997 | | G02B/5/20 |
| EP | 0 785 457 A2 | 7/1997 | | G02F/1/1333 |
| EP | 0 821 293 A2 | 1/1998 | | G03H/1/04 |
| EP | 0 825 462 A1 | 2/1998 | | G02B/5/32 |
| EP | 0 826 986 A1 | 3/1998 | | G02B/5/20 |
| EP | 0 856 766 A2 | 8/1998 | | G02F/1/1333 |
| EP | 0 856 768 A2 | 8/1998 | | G02F/1/1347 |
| EP | 0 785 457 A3 | 10/1998 | | G02F/1/1333 |
| EP | 0 821 293 A3 | 11/1998 | | G03H/1/04 |
| EP | 0 856 766 A3 | 7/1999 | | G02F/1/1333 |
| EP | 0 856 768 A3 | 8/1999 | | G02F/1/1347 |
| FR | 2 610 733 A1 | 12/1988 | | G02B/27/10 |
| GB | 2 259 213 A | 3/1993 | | G09B/9/32 |
| JP | 3-84516 | 4/1991 | | G02B/27/22 |
| JP | 10 54959 | 2/1998 | | G02B/27/42 |
| WO | WO 94/18596 | 8/1994 | | G02B/27/00 |
| WO | WO 95/04294 | 2/1995 | | |
| WO | WO 97/35223 | 7/1997 | | G02B/27/01 |
| WO | WO 97/36206 | 10/1997 | | G02F/1/1347 |
| WO | 98/04650 | 2/1998 | | |

OTHER PUBLICATIONS

Iwamoto, Kazuyo et al., "An Eye Movement Tracking Type Head Mounted Display for Virtual Reality System: Evaluation Experiments of a Proto–type System," IEEE, Feb. 10, 1994, pp. 13–18.

Iwamoto, Kazuyo et al., "High Resolution, Wide View Angle Head Mounted Display Using Eye Movement Tracking: System Structure and Evaluation Experiments," IEEE International Workshop on Robot and Human Communication, May 7, 1995, pp. 289–294.

Marrakchi, A. et al., "Generation of Programmable Coherent Source Arrays Using Spatial Light Modulators," Optics Letters, vol. 16, No. 12, Jun. 15, 1991, pp. 931–933.

Natarajan, L.V., et al., "Holographic PDLC's for Optical Beam Modulation, Deflection, and Dynamic Filter Applications," (Invited Paper), work performed at the Materials Directorate of the Air Force Research Laboratory at Wright–Patterson Air Force Base, 1998, pp. 44–51.

Patel, J. S. et al., "Electrically Controlled Polarization–independent Liquid–Crystal Fresnel Lens Arrays," Optics Letters, vol. 16, No. 7, Apr. 1, 1991, pp. 532–534.

Stankus, J. J., et al., "Electric–Field–Switchable Stratified Volume Holograms in Photorefractive Polymers," Optics Letters, vol. 19, No. 18, Sep. 15, 1994, pp .1480–1482.

Sutherland, R. L., "Optical Limiters, Switches, and Filters Based on Poloymer Dispersed Liquid Crystals," SPIE, vol. 1080, Liquid Crystal Chemistry, Physics, and Applications, 1989, pp. 83–90.

Sutherland, R. L., et al., "Bragg Gratings in an Acrylate Polymer Consisting of Periodic Polymer–Dispersed Liquid–Crystal Planes," Chem. Mater., vol. 5, No. 10, 1993, pp. 1533–1538.

Sutherland, R. L., et al., Electrically Switchable Volume Gratings in Polymer–Dispersed Liquid Crystals, Applied Physics Letters, vol. 64, No. 9, Feb. 28, 1994, pp. 1074–1076.

Sutherland, R. L., et al., "Switchable Holograms in New Photopolymer–Liquid Crystal Composite Materials," SPIE, vol. 2404, Mar. 1995, pp. 132–143.

Tam, Eddy C., et al., "Spatial–Light Modulator–Based Electro–Optical Imaging System," Applied Optics, vol. 31, No. 5, Feb. 10, 1992, pp. 578–579.

Tanaka, Keiji, et al., "Holographically Formed Liquid–Crystal/Polymer Device for Reflective Color Display," 2320 Journal of the Society for Information Display, No. 1, Apr. 1994, pp. 37–40.

* cited by examiner

ILLUMINATION SYSTEM USING OPTICAL FEEDBACK

This application claims priority to provisional application entitled Illumination System Using Optical Feedback, Ser. No. 60/125,926 filed Mar. 23, 1999.

BACKGROUND OF THE INVENTION

1 Field of the Invention

The present invention relates generally to illumination systems, and more particularly to an illumination system using optical feedback.

2 Description of the Related Art

Illumination systems generate light for illuminating objects including image displays. Unfortunately, the output light of conventional illumination systems often varies in intensity. The variance in intensity may be uniform across the spectral frequency of the output light or localized in a non-uniform fashion to one or more visible bandwidths (e.g. red, green, or blue light) thereof. The inconsistencies may result from a variety of factors including temperature variations of the light source of the illumination system, age related physical changes in the light source, or changes in the ambient conditions in which the light source operates.

SUMMARY OF THE INVENTION

The present invention relates to an illumination system using optical feedback to maintain a predetermined light intensity output. The illumination system employs an electrically controllable optical filter for filtering light received thereby. The illumination system also includes a light detector for detecting at least a portion of the light filtered by the electrically controllable optical filter. The light detector is in data communication with the electrically controllable optical filter. Some or all light filtered by the electrically controllable optical filter is detected by the light detector, which, in turn generates a corresponding signal that is compared to at least one predetermined value. If the signal generated by the light detector differs when compared to the at least one predetermined value, one or more filtering characteristics of the electrically controllable optical filter are varied which, in turn, varies the amount of light filtered by the electrically controllable optical filter. The filtering characteristics of the electrically controllable optical filter continue to be varied until the signal generated by the light detector substantially matches the at least one predetermined value.

In one embodiment, the electrically controllable optical filter includes one or more electrically switchable holographic optical elements. Each of the electrically switchable holographic optical elements operates between an active state and an inactive state depending upon the magnitude of a voltage received thereby. In the inactive state, light incident upon the electrically switchable holographic optical element is transmitted therethrough without substantial alteration. In the active state, the electrically switchable holographic optical element diffracts a select bandwidth of the received incident light into at least a zero order-diffracted component and a first order diffracted component. The remaining, undiffracted portions of incident light are transmitted by the activated electrically switchable holographic optical element without substantial alteration. In the active state, the intensity of light in the zero order-diffracted component and the first order diffracted component depends on the magnitude of the voltage received by the electrically switchable holographic optical element.

BRIEF DESCRIPTION OF THE DRAWINGS

While the invention is susceptible to various modifications and alternative forms, specific embodiments thereof are shown by way of example and the drawings and will be herein described in detail. It should be understood, however, that the drawing and detailed description thereto are not intended to limit the invention to the particular form disclosed. On the contrary, the intention is to cover all modifications, equivalents and alternatives falling with in the spirit and scope of the present invention as defined by the appended claims.

The present invention may be better understood, and it's numerous objects, features, and advantages made apparent to those skilled in the art by referencing the accompanying drawings.

DESCRIPTION OF THE PREFERRED EMBODIMENT(S)

Figure 1:
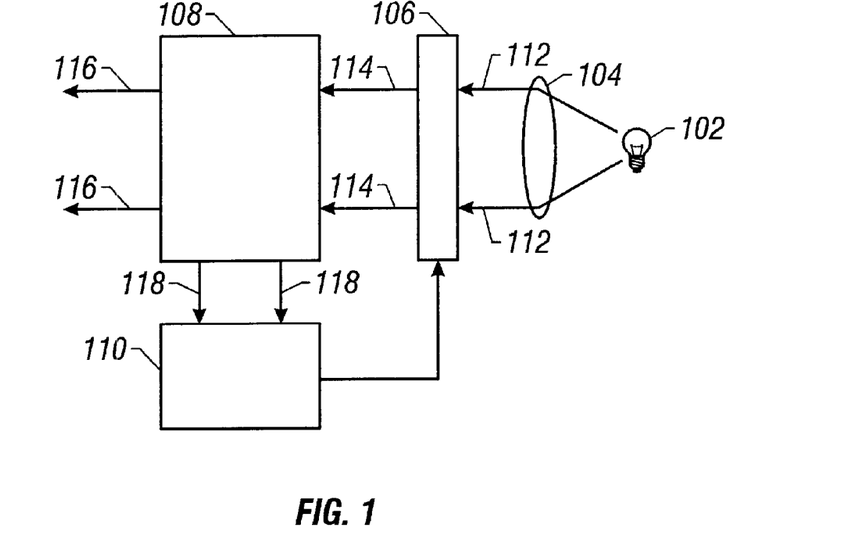
FIG. 1 is a block diagram of an illumination system according to one embodiment of the present invention.

FIG. 1 shows one embodiment of an illumination system using optical feedback to produce an illumination light at one or more predetermined intensities in accordance with the present invention. The illumination system in FIG. 1 includes a light source 102, a lens 104, an electrically controllable optical filter 106, a light deflector 108, and a feedback system 110.

The light source 102 shown in FIG. 1 generates light in the visible bandwidth. This light includes the primary color components (e.g., red, green, and blue bandwidth light). In a preferred embodiment light source 102 is a single light source that continuously emits, the red, green, and blue bandwidth components. Alternatively, light source 102 may include three individual light sources each continuously emitting one of the red, green, and blue bandwidth light. In still yet another alternative, light source 102, whether a single light source or three individual light sources, may sequentially emit red, green, and blue bandwidth light. The light sources could be lasers.

In the embodiment shown in FIG. 1, light emitted by light source 102 is collimated by lens 104 into collimated or parallel light 112. Collimating lens 104 may be defined by a traditional optical element or system of lens and/or mirror elements formed from glass, plastic, etc. This embodiment of lens 104 is static in nature. Alternatively, lens 104 may take embodiment in one or more electrically switchable holographic optical elements described in copending U.S. patent application Ser. No. 09/366,449 entitled Pancake Window Display System Employing One Or More Switchable Holographic Optical Elements filed Aug. 3, 1999, which is incorporated herein by reference.

Collimated light 112 transmitted by lens 104 falls incident upon electrically controllable optical filter 106. Filter 106 operates to filter collimated light 112 in accordance with one or more feed back control signals generated by feedback system 110. Filtered light 114 emitted by filter 106 falls incident on deflector 108 which, in turn, deflects all or a portion of filtered light 114 to feedback system 110. Filtered light 114 which is not deflected, emits from deflector 108 as illumination light 116 for illuminating some object.

Deflector 108 may be a static device that continuously deflects a portion of filtered light 114 incident thereon to feedback system 110. Alternatively deflector 108 may be embodied in one or more electrically switchable holographic optical elements which continuously deflect a portion of the filtered light 114 incident thereon or which deflects a portion or all of filtered light 114 incident thereon to feedback system 110 at predetermined intervals in time.

Feedback system 110 receives deflected light 118 from deflector 108 and in response thereto, generates one or more feedback control signals which control one or more of the filtering characteristics of filter 106. In essence, feedback system 110 functions to measure the intensity of deflected light 118, continuously or at discrete intervals, to determine if the intensity of deflected light 118 is at one or more predetermined intensities. More particularly, the intensity of deflected light 118 at a point in time is compared by feedback system 110 to a predetermined intensity. If deflected light 118 intensity is equal or substantially equal to the predetermined intensity, then filtered light 114 and illumination light 116 are presumed to have intensities equal or substantially equal to predetermined values, respectively. If deflected light 118 deviates from its predetermined intensity, feedback system detects the deviation and adjusts the one or more control signals provided to control filter 106 which, in turn, adjusts the filter 106 until deflected light 118 returns to its predetermined intensity.

Feedback system 110 is described above as controlling the filtering characteristics of filter 106 as a function of the intensity of a portion of filtered light 112. However, the present invention should not be limited thereto. Rather, the present invention contemplates alternative embodiments in which, for example, a feedback system controls a filter in response to measuring and comparing the intensity of all or substantially all of the filtered light 114 at predetermined intervals of time.

Figure 2:
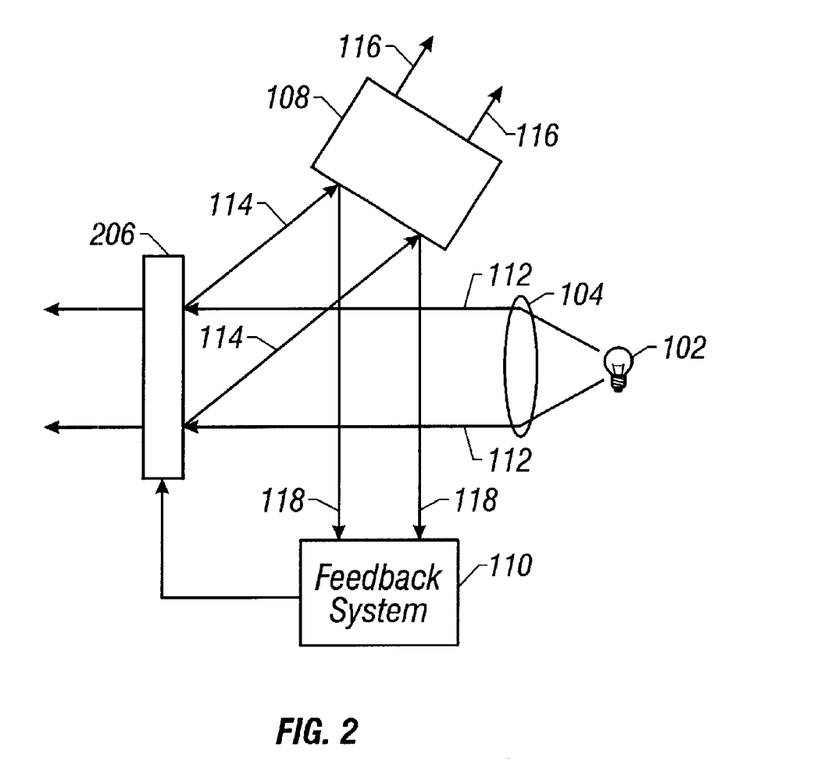
FIG. 2 is a block diagram of an illumination system according to another embodiment of the present invention.

FIG. 2 shows an alternative embodiment of an illumination system using optical feedback to maintain an illumination light output at one or more predetermined intensities in accordance with the present invention. The embodiments shown in FIGS. 1 and 2 operate in similar manner. Whereas FIG. 1 shows a transmissive type illumination system, FIG. 2, in contrast, shows as a reflective type illumination system.

In FIG. 2, the illumination system includes a light source 102, a lens 104, an electrically controllable optical filter 206, deflector 108, and feedback system 110. The system shown in FIG. 2 employs many of the same elements of FIG. 1. Common reference numbers are used to identify common elements in the systems shown in FIGS. 1 and 2.

Like filter 106 shown in FIG. 1, filter 206 receives and filters collimated light 112 in accordance with control signals received from feedback system 110. Whereas filter 106 emits filtered light 114 from a surface opposite to that which receives the collimated light 112, filter 206 of FIG. 2 emits filtered light 114 from the same surface that receives the collimated light 112. Deflector 108 deflects a portion or all of the filtered light 114. This deflected light is provided to feedback system 110. The remaining portion of filtered light 114 not deflected, emits from deflector 108 as illumination light 116.

Feedback system 110 shown in FIG. 2 operates in a manner substantially similar to that described with reference to FIG. 1. The feedback system in FIG. 2 receives deflected light 118 and generates one or more feedback control signals that control filter 206. Feedback system 110 measures deflected light 118 to determine if it equals or substantially equals one or more predetermined intensities. The one or more predetermined intensities in this embodiment may differ from the one or more predetermined intensities employed in the system shown in FIG. 1.

Filters 106 and 206 filter collimated light 112 by removing or reducing light energy or intensity in one or more select bandwidth components thereof. In a preferred mode of operation, filters 106 and 206, at any given point in time, remove all or substantially all of the intensity of two of the red, green, and blue bandwidth components of collimated light 112 while variably reducing the intensity in the remaining bandwidth component. The amount by which the remaining bandwidth component is reduced depends on the target intensity of the illumination light 116.

The filtering in this preferred mode of operation is performed in a repeated three stage cycle. In the first stage of the cycle, filters 106 and 206, in accordance with a first set of control signals generated by feedback system 110, remove all or substantially all of the green and blue bandwidth components from collimated light 112 while variably reducing the red bandwidth component thereof. Thus, filters 106 and 206 emit a variable portion of the red bandwidth component of collimated light 112 as filtered light 114. Filtered light 114 may contain trace elements of blue or green bandwidth components of collimated light 112.

The emitted red bandwidth filtered light 114 is measured by feedback system 110 via deflected light 118. The emitted red bandwidth filtered light 114 should have an intensity equal to or substantially equal to a first predetermined value. If the intensity of the red bandwidth filtered light 114 deviates from the first predetermined value, feedback system 110 generates a new set of first control signals. Feedback system 110 corrects intensity deviations by adjusting the filtering characteristics of filters 106 and 206 using the new first set of feedback control signals.

In a second stage of the cycle subsequent to the first stage, filters 106 and 206, in accordance with a second set of control signals generated by feedback system 110, remove all or substantially all of the red and blue bandwidth components from collimated light 112 while variably reducing the green bandwidth component thereof. Thus, filters 106 and 206 emit a variable portion of the green bandwidth component of collimated light 112 as filtered light 114. Filtered light 114 may contain trace elements of blue or red bandwidth components of collimated light 112.

The emitted green bandwidth filtered light 114 is measured by feedback system 110 via deflected light 118. The emitted green bandwidth filtered light 114 should have an intensity equal to or substantially equal to a second predetermined value. If the intensity of the green bandwidth filtered light 114 deviates from the second predetermined value, feedback system 110 generates a new set of second control signals. Feedback system 110 corrects intensity deviations by adjusting the filtering characteristics of filters 106 and 206 using the new second set of feedback control signals.

In a third stage of the cycle subsequent to the second stage, filters 106 and 206, in accordance with a third set of control signals generated by feedback system 110, remove all or substantially all of the green and red bandwidth components from collimated light 112 while variably reducing the blue bandwidth component thereof. Thus, filters 106 and 206 emit a variable portion of the blue bandwidth component of collimated light 112 as filtered light 114. Filtered light 114 may contain trace elements of red or green bandwidth components of collimated light 112.

The emitted blue bandwidth filtered light 114 is measured by feedback system 110 via deflected light 118. The emitted blue bandwidth filtered light 114 should have an intensity equal to or substantially equal to a third predetermined value. If the intensity of the blue bandwidth filtered light 114 deviates from the third predetermined value, feedback system 110 generates a new set of third control signals. Feedback system 110 corrects intensity deviations by adjusting the filtering characteristics of filters 106 and 206 using the new third set of feedback control signals.

In a first alternative mode of operation, filters 106 and 206 remove all or substantially all of the energy in one of the red, green, and blue bandwidth components of collimated light 112 while variably reducing the intensity contained in the remaining two bandwidth components. Again, the filtering is performed in a repeated cycle. In the first stage of the cycle of this alternative mode, filters 106 and 206, in accordance with a first set of control signals generated by feedback system 110 remove all or substantially all of the blue bandwidth component from collimated light 112 while variably reducing the red and green bandwidth components of collimated light 112. The first set of control signals in this mode is distinct from the first set of control signals employed in the preferred mode. Thus, filters 106 and 206 emit a variable portion of the red and green bandwidth components of collimated light 112 as filtered light 114. Filtered light 114 may contain trace elements of blue bandwidth light. The emitted red and green bandwidth filtered light 114, in combination, should have an intensity equal to or substantially equal to a first predetermined value. The first predetermined value used in this mode may be different from the first predetermined value used in the preferred mode. If the intensity of the red and green bandwidth filtered light 114 deviates from the first predetermined value, the deviation is detected by feedback system 110 via deflected light 118, and feedback system 110 generates a new set of first control signals. Feedback system 110 corrects the deviation by adjusting filters 106 and 206 using the new first set of feedback control signals.

In a second stage of the cycle of this alternative mode, filters 106 and 206, in accordance with a second set of control signals generated by feedback system 110 remove all or substantially all of the green bandwidth component from collimated light 112 while variably reducing the red and blue bandwidth components of collimated light 112. The second set of control signals in this mode is distinct from the second set of control signals employed in the preferred mode. Thus, filters 106 and 206 emit a variable portion of the red and blue bandwidth components of collimated light 112 as filtered light 114. Filtered light 114 may contain trace elements of green bandwidth light. The emitted red and blue bandwidth filtered light 114, in combination, should have an intensity equal to or substantially equal to a second predetermined value. The second predetermined value used in this mode may be different from the second predetermined value used in the preferred mode. If the intensity of the red and blue bandwidth filtered light 114 deviates from the second predetermined value, the deviation is detected by feedback system 110 via deflected light 118, and feedback system 110 generates a new set of second control signals. Feedback system 110 corrects the deviation by adjusting filters 106 and 206 using the new second set of feedback control signals.

In a third stage of the cycle of the alternative mode, filters 106 and 206, in accordance with a third set of control signals generated by feedback system 110 remove all or substantially all of the red bandwidth component from collimated light 112 while variably reducing the blue and green bandwidth components of collimated light 112. The third set of control signals in this mode is distinct from the third set of control signals employed in the preferred mode. Thus, filters 106 and 206 emit a variable portion of the blue and green bandwidth components of collimated light 112 as filtered light 114. Filtered light 114 may contain trace elements of red bandwidth light. The emitted blue and green bandwidth filtered light 114, in combination, should have an intensity equal to or substantially equal to a third predetermined value. The third predetermined value used in this mode may be different from the third predetermined value used in the preferred mode. If the intensity of the blue and green bandwidth filtered light 114 deviates from the third predetermined value, the deviation is detected by feedback system 110 via deflected light 118, and feedback system 110 generates a new set of third control signals. Feedback system 110 corrects the deviation by adjusting filters 106 and 206 using the new third set of feedback control signals.

In a second alternative mode of operation, filters 106 and 206 operate to variably reduce the light intensity contained in all three of the red, green, and blue bandwidth components of collimated light 112 in accordance with one feedback control signal generated by feedback system 110. In this second alternative mode, filters 106 and 206 emit a variable portion of each of the red, green and blue bandwidth components of collimated light 112 as filtered light 114. The red, green, and blue bandwidth filtered light 114 emitted by filters 106 and 206, respectively, should have an intensity equal to or substantially equal to a predetermined value. If the intensity of combined red, green, and blue bandwidth filtered light 114 deviates from the predetermined value, the deviation is detected by feedback system 110 via deflected light 118. Feedback system 110 corrects the deviation by adjusting filters 106 and 206 using a new control signal generated by feedback system 110.

Figure 3:
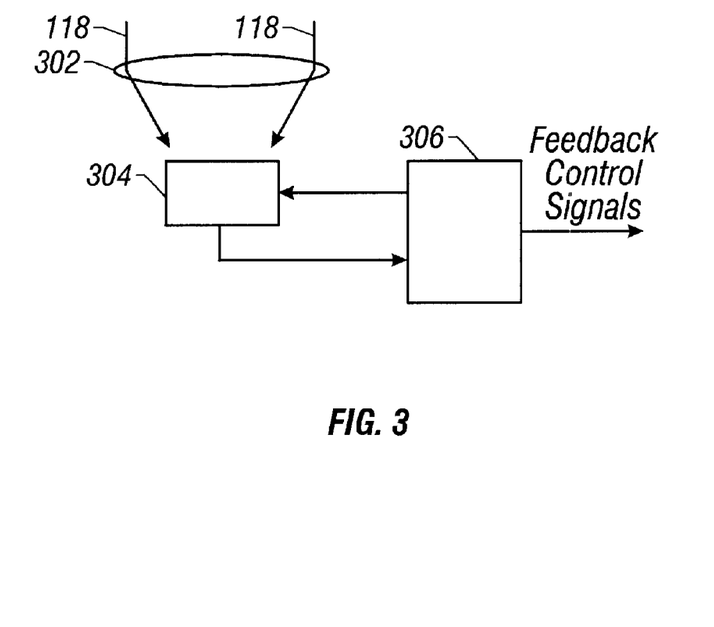
FIG. 3 is a block diagram of a feedback system that may be used to control the electrically controllable optical filter shown in FIGS. 1 and 2.

FIG. 3 shows one embodiment of feedback system 110. More particularly, FIG. 3 shows feedback system having a lens 302, a light detector 304, and a control circuit 306. In one embodiment, lens 302 is a conventional collection lens that focuses deflected light 118. The conventional lens 302 may take form in glass, plastic or other static material. Alternatively, lens 302 may take form in one or more electrically switchable holographic optical elements that record a collection lens therein. A collection lens embodied in one more electrically switchable holographic optical elements is described in U.S. patent application Ser. No. 09/313,431 entitled Switchable Holographic Optical System, filed May 17, 1999 which is incorporated herein by reference. Although not shown, control circuit 306 could be extended to provide signals for controlling a collection lens 302 embodied in one or more electrically switchable holographic optical elements. Lens 302 collects or focuses deflected light 118 onto detector 304.

Light detector 304 takes form in any one of several types of light detectors including photo capacitors, photo diodes, etc. Essentially, light detector 304 generates an output signal as a function of the intensity of deflected light 118 incident thereon. The magnitude of the detector's output signal corresponds to the intensity of light detected. This correspondence can be linear. The detector 304 may continuously generate an output signal as a function of the light intensity incident thereon. Alternatively, the detector 304 may detect deflected light and generate a corresponding output signal at predetermined intervals in accordance with a control or sample signal received from control circuit 306.

Deflected light 118 may contain one or more of the red, green, or blue bandwidths depending on the mode in which filter 106 or 206 operates. In the embodiment where filters 106 and 206 remove all or substantially all of the energy of two of the red, green, and blue bandwidth components of collimated light 112 while variably reducing the energy in the remaining bandwidth component, deflected light 118 includes only one of the red, green, or blue bandwidths. Trace components of the remaining bandwidths may be present in the deflected light 118. In this embodiment, deflected light 118 cycles through the red, green, and blue bandwidth components. In the embodiment where filters 106 and 206 remove all or substantially all of the energy in one of the red, green, and blue bandwidth components of collimated light 112 while variably reducing the remaining the energy contained in the remaining two bandwidth components, deflected light 118 includes only two of the red, green, or blue bandwidths. Trace components of the remaining bandwidth may be present in the deflected light 118. In this embodiment, deflected light 118 cycles through combinations of two of the red, green, and blue bandwidth components. In the embodiment where filters 106 and 206 operate to variably reduce the energy contained in all three of the red, green, and blue bandwidth components of collimated light 112, deflected light 118 contains all three of the bandwidth components.

Control circuit 306 functions in a variety of modes corresponding to the variety of modes in which filter 106 or 206 operates. Control circuit 306, in one embodiment, includes three output registers (an output register associated with each of the red, green, and blue bandwidths, all three of which are not shown in the Figures) that, in combination, output the control signals used to control filter 106 or 206. Control circuit 304 will be described with reference to the mode described above in which filter 106 or 206 removes all or substantially all of the energy of two of the red, green, and blue bandwidth components of collimated light 112 while variably reducing the energy in the remaining bandwidth component, it being understood that control circuit 106 or 206 can operate in other modes. In this mode, filters 106 and 206 cycles through first, second, and third stages. The red bandwidth associated output register stores a red bandwidth control signal for controlling the amount of red bandwidth light removed by filter 106 or 206. The red bandwidth output register stores either a first red bandwidth control signal that causes filter 106 or 206 to remove all or substantially all of the red bandwidth component from collimated light 112, or a second red bandwidth control signal that causes filter 106 or 206 to remove a variable portion of the red bandwidth component of collimated light 112. In one embodiment, the first red bandwidth control signal is stored in a first red bandwidth control register while the second red bandwidth control signal is stored in a second red bandwidth control register.

The green bandwidth associated output register stores a green bandwidth control signal for controlling the amount of green bandwidth light removed by filter 106 or 206. The green bandwidth output register stores either a first green bandwidth control signal that causes filter 106 or 206 to remove all or substantially all of the green bandwidth component from collimated light 112, or a second green bandwidth control signal that causes filter 106 or 206 to remove a variable portion of the green bandwidth component of collimated light 112. In one embodiment, the first green bandwidth control signal is stored in a first green bandwidth control register while the second green bandwidth control signal is stored in a second green bandwidth control register.

The blue bandwidth associated output register stores a blue bandwidth control signal for controlling the amount of blue bandwidth light removed by filter 106 or 206. The blue bandwidth output register stores either a first blue bandwidth control signal that causes filter 106 or 206 to remove all or substantially all of the blue bandwidth component from collimated light 112, or a second blue bandwidth control signal that causes filter 106 or 206 to remove a variable portion of the blue bandwidth component of collimated light 112. In one embodiment, the first blue bandwidth control signal is stored in a first blue bandwidth control register while the second blue bandwidth control signal is stored in a second blue bandwidth control register.

The contents of the three output registers are maintained by the control circuit 306 and depend on the cycle stage in which filter 106 or 206 is operating at the time. In the first cycle stage, the red bandwidth output register stores the second red bandwidth control signal, while the green and blue bandwidth output registers store the first green and first blue bandwidth control signals, respectively. In the second cycle stage, the green bandwidth output register stores the second red bandwidth control signal, while the red and blue bandwidth output registers store the first red and first blue bandwidth control signals, respectively. In the third cycle stage, the blue bandwidth output register stores the second blue bandwidth control signal, while the green and red bandwidth output registers store the first green and first red bandwidth control signals, respectively.

The second red, green, and blue bandwidth control signals stored in the second red, green, and blue bandwidth control registers, respectively, may change during operation of the illumination system to offset intensity deviations in deflected light 118. As noted above, the intensity of deflected light 118 is checked during each stage of the three-stage cycle. In the first stage, the deflected light 118 includes essentially, only red bandwidth light. In the first stage a detector output signal is generated that is proportional to the red bandwidth deflected light 118. Thereafter, control circuit 306 compares the detector output signal to a first predetermined value previously stored in memory of control circuit 306. If the detector output signal equals or substantially equals the first predetermined value, then the second red bandwidth control signal is left unchanged, and filter 106 or 206, in the first stage of the next cycle, is provided with the same second red bandwidth control signal in addition to the first green and first blue bandwidth control signals. The second red bandwidth control signal, the first green bandwidth control signal and the first blue bandwidth control signal collectively constitute the first set of control signals mentioned above. If the detector output signal does not equal or substantially equal the first predetermined value, then the second red bandwidth control signal is updated accordingly. In next first stage, the updated second red bandwidth control signal is provided to filter 106 or 206 along with the first green and blue bandwidth control signals, all three signals being provided as the new first set control signals. The intensity of red bandwidth filtered light emitted by filter 106 or 206 in response to receiving the new set of first control signals is different when compared to the intensity of filtered red bandwidth light emitted by filter 106 or 206 in response to receiving the first set of control signals.

The first red bandwidth control signal may be updated in a number of ways. More particularly, the first red bandwidth control signal may be increased or decreased by a set amount depending on whether the detector output signal is smaller or greater than the first predetermined value. Alternatively, a difference can be calculated between the detector output signal and the first predetermined value, and the first red bandwidth control signal may be increased or decreased by an amount proportional to the difference. In this embodiment, the intensity of the deflected light 118 is checked during each first stage of each cycle.

The intensity of deflected light 118 is also checked during the second stage of the three-stage cycle in essentially the same way deflected light 118 is checked in the first stage. In the second stage, the deflected light 118 includes essentially, only green bandwidth light. In the second stage a detector output signal is generated that is proportional to the green bandwidth deflected light 118. Thereafter, control circuit 306 compares the detector output signal to a second predetermined value previously stored in memory of control circuit 306. if the detector output signal equals or substantially equals the second predetermined value, then the second green bandwidth control signal is left unchanged, and filter 106 or 206, in the second stage of the next cycle, is provided with the same second green bandwidth control signal in addition to the first red and first blue bandwidth control signals. The second green bandwidth control signal, the first red bandwidth control signal and the first blue bandwidth control signal collectively constitute the second set of control signals mentioned above. If the detector output signal does not equal or substantially equal the second predetermined value, then the second green bandwidth control signal is updated accordingly. In next second stage, the updated second green bandwidth control signal is provided to filter 106 or 206 along with the first red and blue bandwidth control signals, all three signals being provided as the new second set control signals. The intensity of green bandwidth filtered light emitted by filter 106 or 206 in response to receiving the new set of second control signals is different when compared to the intensity of filtered green bandwidth light emitted by filter 106 or 206 in response to receiving the second set of control signals.

The second green bandwidth control signal may be updated in a manner similar to the manner in which the second red bandwidth control signal as updated. More particularly, the second green bandwidth control signal may be increased or decreased by a set amount depending on whether the detector output signal is smaller or greater than the second predetermined value. Alternatively, a difference can be calculated between the detector output signal and the second predetermined value, and the second green bandwidth control signal may be increased or decreased by an amount proportional to the difference. In this embodiment, the intensity of the deflected light 118 is checked during each second stage of each cycle.

The intensity of deflected light 118 is checked during the third stage of the three-stage cycle in essentially the same way deflected light 118 is checked in the first and second stages. In the third stage, the deflected light 118 includes essentially, only blue bandwidth light. In the third stage a detector output signal is generated that is proportional to the blue bandwidth deflected light 118. Thereafter, control circuit 306 compares the detector output signal to a third predetermined value previously stored in memory of control circuit 306. If the detector output signal equals or substantially equals the third predetermined value, then the second blue bandwidth control signal is left unchanged, and filter 106 or 206, in the third stage of the next cycle, is provided with the same second blue bandwidth control signal in addition to the first green and first red bandwidth control signals. The second blue bandwidth control signal, the first green bandwidth control signal and the first red bandwidth control signal collectively constitute the third set of control signals mentioned above. If the detector output signal does not equal or substantially equal the third predetermined value, then the second blue bandwidth control signal is updated accordingly. In next third stage, the updated second blue bandwidth control signal is provided to filter 106 or 206 along with the first green and red bandwidth control signals, all three signals being provided as the new third set control signals. The intensity of blue bandwidth filtered light emitted by filter 106 or 206 in response to receiving the new set of third control signals is different when compared to the intensity of filtered blue bandwidth light emitted by filter 106 or 206 in response to receiving the third set of control signals.

The second blue bandwidth control signal may be updated in the same way that the second red bandwidth and second green bandwidth control signals are updated. More particularly, the second blue bandwidth control signal may be increased or decreased by a set amount depending on whether the detector output signal is smaller or greater than the third predetermined value. Alternatively, a difference can be calculated between the detector output signal and the third predetermined value, and the second blue bandwidth control signal may be increased or decreased by an amount proportional to the difference. In this embodiment, the intensity of the deflected light 118 is checked during each third stage of each cycle.

Filters 106 and 206 are solid state systems. Filters 106 and 206 may take form in one of several embodiments. More particularly, Filters 106 and 206 may be embodied in one or more layers of conventional liquid crystal material. Alternatively, Filters 106 and 206 may be embodied in conventional interference filters combined with electronically controllable neutral density filters based on liquid crystal. U.S. patent application Ser. No. 09/478,150 entitled Optical Filter Employing Holographic Optical Elements And Image Generating System Incorporating The Optical Filter, filed Jan 5, 2000, which is incorporated herein by reference, discloses several embodiments of the filters 106 and 206 shown in FIGS. 1 and 10.

Filters 106 or 206 may be formed of one or more electrically switchable holographic optical elements each of which can independently operate in an active state or an inactive state in accordance with a control signal. In the inactive state, each electrically switchable holographic optical element passes collimated light 112 without substantial alteration. In the active state, each electrically switchable holographic optical element diffracts a select bandwidth (e.g., red bandwidth) of collimated light 112 while passing the remaining portions (e.g., green and blue bandwidths) of collimated light 112 without substantial alteration. The diffracted light emerges from the electrically switchable holographic optical element as zero order and first order diffracted light having an angle therebetween. The zero order-diffracted component emerges from the electrically switchable holographic optical element normal to the emitting surface thereof. The electrically switchable holographic optical element may diffract the select bandwidth into higher order components. However, this disclosure will presume that all of the select bandwidth is diffracted into zero order or first order diffracted light. Further, the amount of light energy contained in the zero order and first order diffracted components depends on a magnitude of a voltage of the control signal applied to the electrically switchable holographic optical element as will be more fully described below.

Figure 4:
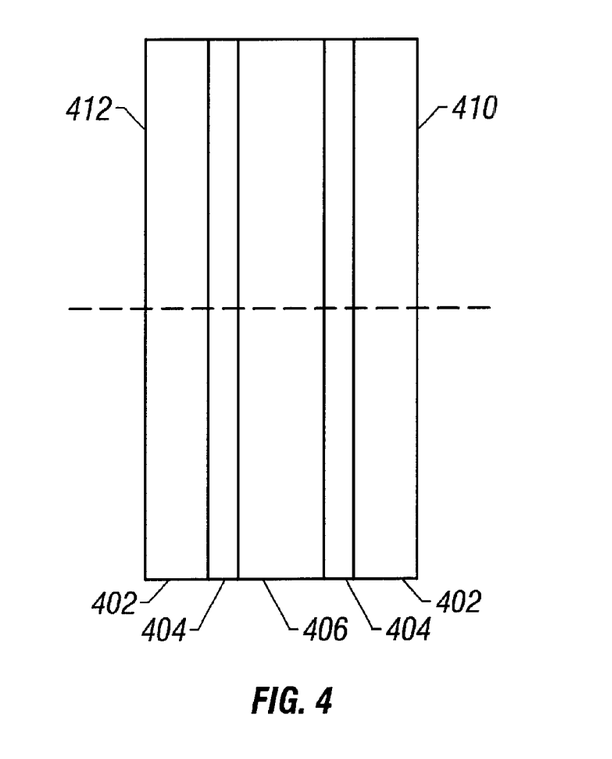
FIG. 4 is a cross sectional view of an electrically switchable holographic optical element employable in the electrically controllable optical filter shown in FIGS. 1 and 2.

FIG. 4 shows a cross sectional view of one embodiment of an electrically switchable holographic optical element that can be used in filters 106 or 206. The switchable holographic optical element of FIG. 4 includes a pair of substantially transparent and electrically non-conductive layers 402, a pair of substantially transparent and electrically conductive layers 404, and a switchable holographic layer 406 formed, in one embodiment, from the polymer dispersed liquid crystal material described in U.S. patent application Ser. No. 09/478,150 which, as noted above, is incorporated herein by reference. In one embodiment, the substantially transparent, electrically non-conductive layers 402 comprise glass, while the substantially transparent, electrically conductive layers 404 comprise indium tin oxide (ITO). An anti-reflection coating (not shown) may be applied to selected surfaces of the switchable holographic optical element, including surfaces of the ITO and the electrically nonconductive layers, to improve the overall transmissive efficiency of the optical element and to reduce stray light. As shown in the embodiment of FIG. 4, all layers 402–406 are arranged like a stack of pancakes on a common axis 408.

Layers 402–406 may have substantially thin cross-sectional widths, thereby providing a substantially thin aggregate in cross section. More particularly, switchable holographic layer 406 may have a cross-sectional width of 5–12 microns (the precise width depending on a spectral bandwidth and required diffraction efficiency), while glass layers 402 may have a cross-sectional width of 0.4–0.8 millimeters. Obviously, ITO layers 404 must be substantially thin to be transparent. It should be noted that holographic layers may be deposited on thin plastic substrates. The plastic substrates may also be flexible.

With ITO layers 404 coupled to a first voltage, an electric field is established within the switchable holographic layer 406 and the switchable holographic element operates in the inactive state described above. However, when the ITO layers 404 are coupled to a voltage below the first voltage, the switchable holographic optical element operates in the active state as described above. When active, the electrically switchable holographic optical element diffracts, for example, the red bandwidth component of collimated incident light 112 while passing the remaining components of collimated incident light 112, including green and blue bandwidth components, without substantial alteration. The diffracted light emerges as zero order and first order components. The intensity of light in the first and zero order components depends on the magnitude of the voltage applied to the ITO layers 404. A reduction of the voltage applied to the ITO layers 404 reduces the energy in the zero-order diffracted component while simultaneously and proportionately increasing the energy in the first diffracted component. In other words, linearly lowering the voltage applied to the ITO layers 404 causes a linear transfer of light energy (i.e., intensity) from the zero order to the first order components. Either the zero order or the first order diffracted light could be used as filtered light 114 shown in FIG. 1. The first order diffracted light could be used as filtered light 114 shown in FIG. 2.

The switchable holographic optical element shown in FIG. 4 may be reflective or transmissive type. FIG. 4 shows switchable holographic optical element with oppositely facing front and back surfaces 410 and 412. Whether reflective or transmissive type, collimated light 112 falls incident on the front surface 410 at normal incidence angle. Note that it is not essential for the incident light to be at normal incidence, althought this is likely to be the preferred option in most applications If the switchable holographic optical element is configured as transmissive type, the zero order and first order diffracted light components emerge from back surface 412. In contrast, if the electrically switchable holographic optical element is configured as reflective type hologram, the first order diffracted light component emerges from front surface 410 while the zero order diffracted component emerges from the back surface. Either one or more reflective or transmissive type electrically switchable holographic optical elements could be used in the filter 106 of FIG. 1. Filter 206 shown in FIG. 2 may employ one or more reflective type electrically switchable holographic optical elements.

Switchable holographic layer 406 records a hologram using conventional techniques. In one embodiment, the resulting hologram is characterized by a high diffraction efficiency and a fast rate at which the optical element can be switched between active and inactive states. In the embodiment of switchable holographic layer 406 formed from polymer dispersed liquid crystal (PDLC) material, the recorded hologram can be switched from a diffracting state to a transmitting state with the creation and elimination of the electric field mentioned above. Preferably, the holograms recorded in the holographic layer 406 would be Bragg (also know as thick or volume phase) type in order to achieve high diffraction efficiency. Raman-Nath or thin phase type holograms may also be employed.

The hologram recorded in switchable holographic layer 406 can be based on PDLC materials described in the 09/478,150 application which is incorporated herein by reference. The hologram, in one embodiment, results in an interference pattern creating by recording beams, i.e., a reference beam and an object beam, within layer 406. Interaction of the laser light with the PDLC material causes photopolymerization. Liquid crystal droplets become embedded in the dark regions of the fringe patterns that are formed by the intersection of the recording beams during the recording process. Stated differently, the recording material may be a polymer dispersed liquid crystal mixture which undergoes phase separation during the recording process, creating regions densely populated by liquid crystal microdroplets, interspersed by regions of clear photopolymer. When a voltage of sufficient magnitude is supplied to ITO layers 404, the liquid crystal droplets reorient and change the refractive index of the hologram layer 406 thereby essentially erasing the hologram recorded therein so that all collimated light 112 incident thereon passes without noticeable alteration. The material used within layer 406 is configured to operate at a high switching rate (e.g., the material can be switched in tens of microseconds, which is very fast when compared with conventional liquid crystal display materials) and a high diffraction efficiency.

Figure 5:
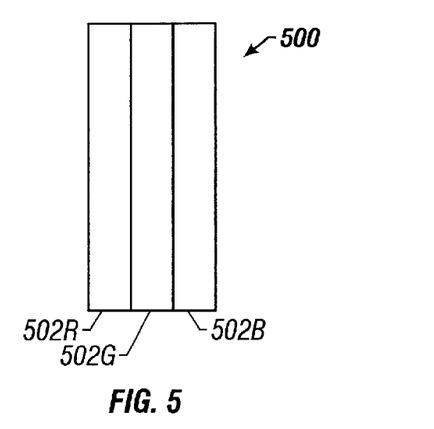
FIG. 5 is a block diagram of an electrically switchable holographic optical element filter employable in the electrically controllable optical filter shown in FIGS. 1 and 2.

FIG. 5 shows one embodiment of filter 106 or 206 employing three separate electrically switchable holographic optical elements 502R, 502G, and 502B. Each of the electrically switchable holographic optical elements 502R through 502B is configured to diffract a select bandwidth of collimated light 112 incident thereon when the element operates in the active state. More particularly, electrically switchable holographic optical elements 502R is configured to diffract red bandwidth light when active while passing the remaining components of collimated light 112 without substantial alteration. Similarly the electrically switchable holographic optical elements 502G and 502B are configured to diffract green bandwidth and blue bandwidth components, respectively, of collimated light 112 when active while passing the remaining components of collimated light 112 without substantial alteration. Each of the electrically switchable holographic optical elements 502R through 502B pass substantially all bandwidths of collimated light 112 without substantial alteration when operating in the inactive state.

Each of the three electrically switchable holographic optical elements 502R through 502G is activated or deactivated in accordance with a respective feedback control signal provided by feedback system 110 shown in FIG. 3. In the active state, each of the optical elements diffracts a select bandwidth of collimated light 112 into zero and first order diffracted components. Moreover, in the active state, the intensity of the light contained in the zero and first order diffracted components depends on the magnitude of the feedback control signal provided to the electrically switchable holographic optical element.

In one embodiment, each of the electrically switchable holographic optical elements 502R, 502G, and 502B receives the first or second red bandwidth control signals, the first or second green bandwidth control signals, and the first or second blue bandwidth control signals, respectively, described above. More particularly, the first or second red bandwidth control signals are selectively applied to the ITO layers of electrically switchable holographic optical element 502R, the first or second green bandwidth control signals are selectively applied to the ITO layers of electrically switchable holographic optical element 502G, and the first or second blue bandwidth control signals are selectively applied to the ITO layers of electrically switchable holographic optical element 502B.

Figure 5A:
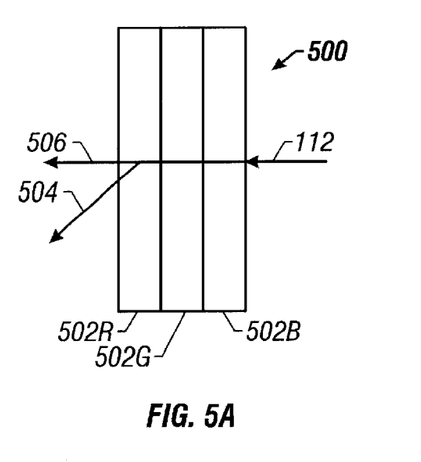
FIG. 5A illustrates the electrically switchable holographic optical element filter of FIG. 5 configured as a transmissive type filter operating in an additive mode.

Filter 500 of FIG. 5 may be configured as transmissive or reflective. Whether transmissive or reflective, filter 500 operates in one of several distinct modes in accordance with feedback control signals provided thereto. FIG. 5A illustrates a reflective filter 500 configured operating in an additive mode. In FIG. 5A, electrically switchable holographic optical element 502R is activated while electrically switchable holographic optical elements 502G and 502B are deactivated. As noted in FIG. 5A, collimated light 112 passes through the deactivated electrically switchable holographic optical elements 502B and 502G without substantial alteration. However, activated electrically switchable holographic optical element 502R diffracts the red bandwidth component of collimated light 112 into zero order and first order diffracted red bandwidth components. In FIG. 5A, light 504 emerging from filter 500 includes first order diffracted red bandwidth light and possibly trace elements of other bandwidth components of collimated light 112. Light 506 emerging from filter 500 in contrast includes the zero order diffracted red bandwidth light in addition to the blue and green bandwidth components of collimated light 112, both of which pass through filter 500 without substantial alteration.

Filter 500 in FIG. 5A is shown diffracting red bandwidth light while substantially transmitting all green and blue bandwidth light. This operational mode of filter 500 may result in response to filter 500 receiving the first set of control signals or the new first set of control signals during the first stage of the three stage cycle described above. More particularly, the second or the updated second red bandwidth control signal is applied to the ITO layers of electrically switchable holographic optical element 502R while the first green and blue bandwidth control signals are applied to the ITO layers of electrically switchable holographic optical elements 502G and 502B, respectively. In this embodiment, the first green and blue bandwidth control signals completely deactivate electrically switchable holographic optical elements 502G and 502B, respectively. In a preferred embodiment, light 504 constitutes filtered light 114 shown in FIG. 1, and the second or updated second red bandwidth control signals are generated by feedback system 110 in order to maintain light 504 (or filtered light 114) at the first predetermined intensity.

Filter 500 in FIG. 5A may also operate in the additive mode to diffract green bandwidth light while substantially transmitting all red and blue bandwidth light in response to receiving the second set of control signals or the new second set of control signals during the second stage of the three stage cycle described above. Additionally, filter 500 of FIG. 5A may operate in the additive mode to diffract blue bandwidth a light while substantially transmitting all red and green bandwidth light in response to receiving the third set of control signals or the new third set of control signals during the third stage of the three stage cycle described above.

Figure 5B:
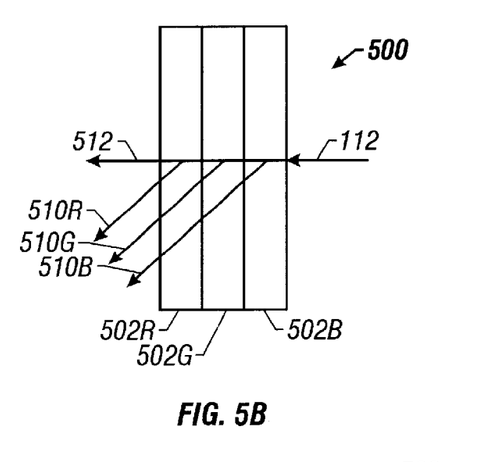
FIG. 5B illustrates the electrically switchable holographic optical element filter of FIG. 5 configured as a transmissive type filter operating in an subtractive mode.

FIG. 5B illustrates filter 500 configured as a transmissive type operating in a subtractive mode. In contrast to the additive mode shown in FIG. 5A, each electrically switchable holographic optical element 502R through 502B is activated. In this mode of operation, each of electrically switchable holographic optical elements 502R through 502B diffract components of collimated light 112. Electrically switchable holographic optical elements 502G and 502B are fully activated in that all or substantially all of the energy contained in the green and blue bandwidth components, respectively, of collimated light 112 are diffracted into first order components 510G and 510B, respectively.

Electrically switchable holographic optical element 502R, as noted above, is also activated. Electrically switchable holographic optical element 502R diffracts the red bandwidth component of collimated light 112 into zero order and first order diffracted components. The first order diffracted red bandwidth light emits from filter 500 as first order diffracted red bandwidth light 510R while the zero order red bandwidth component emits as light 512. if electrically switchable holographic optical elements 502G and 502B operate at maximum theoretical diffraction efficiency, light 512 essentially contains only zero order diffracted red bandwidth light. In the preferred mode, light 512 is used as filtered light 114 as shown in FIG. 1.

Filter 500 in FIG. 5B is shown diffracting all visible components of collimated light 112. This operational mode of filter 500 may result in response to filter 500 receiving the first set of control signals or the new first set of control signals during the first stage of the three stage cycle described above. The magnitudes of the first set of control signals and the new first set of control signals in this mode of operation are distinct from the first set of control signals and the new first set of control signals provided to filter 500 operating in the additive mode described above. In the subtractive mode of operation, the second or the updated second red bandwidth control signal is applied to the ITO layers of electrically switchable holographic optical element 502R while the first green and blue bandwidth control signals are applied to the ITO layers of electrically switchable holographic optical elements 502G and 502B, respectively. In this mode, the first green and blue bandwidth control signals completely activate electrically switchable holographic optical elements 502G and 502B, respectively. In a preferred embodiment, light 512 constitutes filtered light 114 shown in FIG. 1, and the second or updated second red bandwidth control signals are generated by feedback system 110 in order to maintain light 512 (or filtered light 114) at the first predetermined intensity.

Filter 500 in FIG. 5B may also operate in the subtractive mode to diffract all or substantially all of the red and blue bandwidth components of collimated light 112 into first order diffracted components while diffracting the green bandwidth component of collimated light 112 into zero order and first order diffracted components in response to filter 500 receiving the second set of control signals or the new second set of control signals during the second stage of the three stage cycle described above. Additionally, filter 500 of FIG. 5B operate in the subtractive mode to diffract all or substantially all of the red and green bandwidth components of collimated light 112 into first order diffracted components while diffracting the blue bandwidth component of collimated light 112 into zero order and first order diffracted components in response to filter 500 receiving the third set of control signals or the new third set of control signals during the third stage of the three stage cycle described above.

Figure 5C:
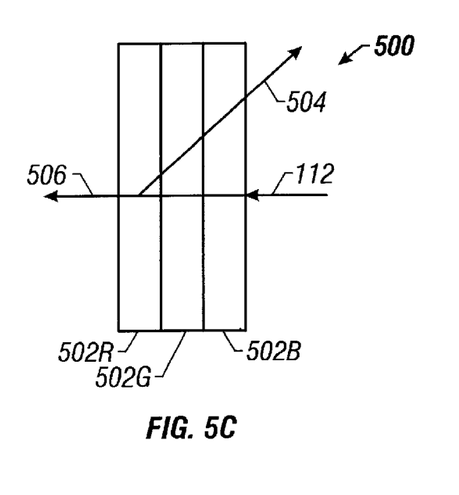
FIG. 5C illustrates the electrically switchable holographic optical element filter of FIG. 5 configured as a reflective type filter operating in an additive mode.

As noted, filter 500 of FIG. 5 may be configured as a reflective type filter. FIG. 5C illustrates a reflective type filter 500 operating in the additive mode. In FIG. 5C, electrically switchable holographic optical element 502R is activated while electrically switchable holographic optical elements 502G and 502B are deactivated. As noted in FIG. 5A, collimated light 112 passes through the deactivated electrically switchable holographic optical elements 502B and 502G without substantial alteration. However, activated electrically switchable holographic optical element 502R diffracts the red bandwidth component of collimated light 112 into zero order and first order diffracted red bandwidth components. In FIG. 5C, light 504 emerging from filter 500 includes first order diffracted red bandwidth light and possibly trace elements of other bandwidth components of collimated light 112. Light 706 emerging from filter 500 in contrast includes the zero order diffracted red bandwidth light in addition to the blue and green bandwidth components of collimated light 112, both of which pass through filter 500 without substantial alteration.

Filter 500 in FIG. 5C is shown diffracting red bandwidth light while substantially transmitting all green and blue bandwidth light. This operational mode of filter 500 may result in response to filter 500 receiving the first set of control signals or the new first set of control signals during the first stage of the three stage cycle described above. More particularly, the second or the updated second red bandwidth control signal is applied to the ITO layers of electrically switchable holographic optical element 502R while the first green and blue bandwidth control signals are applied to the ITO layers of electrically switchable holographic optical elements 502G and 502B, respectively. In this embodiment, the first green and blue bandwidth control signals completely deactivate electrically switchable holographic optical elements 502G and 502B, respectively. In a preferred embodiment, light 504 constitutes filtered light 114 shown in FIG. 2, and the second or updated second red bandwidth control signals are generated by feedback system 110 in order to maintain light 504 (or filtered light 114) at the first predetermined intensity.

Filter 500 in FIG. 5C may also operate in the additive mode to diffract green bandwidth light while substantially transmitting all red and blue bandwidth light in response to receiving the second set of control signals or the new second set of control signals during the second stage of the three stage cycle described above. Additionally, filter 500 of FIG. 5C may operate in the additive mode to diffract blue bandwidth light while substantially transmitting all red and green bandwidth light in response to receiving the third set of control signals or the new third set of control signals during the third stage of the three stage cycle described above.

Figure 5D:
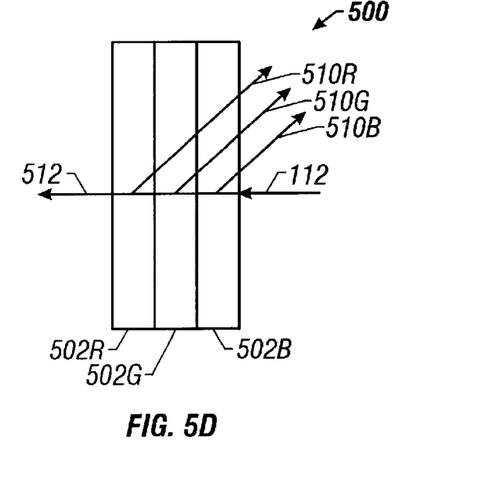
FIG. 5D illustrates the electrically switchable holographic optical element filter of FIG. 5 configured as a reflective type filter operating in an subtractive mode.

FIG. 5D illustrates reflective type filter 500 operating in a subtractive mode. In contrast to the additive mode shown in FIG. 5C, each electrically switchable holographic optical element 502R through 502B is activated. In this mode of operation, each of electrically switchable holographic optical elements 502R through 502B diffract components of collimated light 112. Electrically switchable holographic optical elements 502G and 502B are fully activated in that all or substantially all of the energy contained in the green and blue bandwidth components, respectively, of collimated light 112 are diffracted into first order components 510G and 510B, respectively.

Electrically switchable holographic optical element 502R, as noted above, is also activated. Electrically switchable holographic optical element 502R diffracts the red bandwidth component of collimated light 112 into zero order and first order diffracted components. The first order diffracted red bandwidth light emits from filter 500 as first order diffracted red bandwidth light 510R while the zero order red bandwidth component emits as light 512. If electrically switchable holographic optical elements 502G and 502B operate at maximum theoretical diffraction efficiency, light 512 essentially contains only zero order diffracted red bandwidth light. In the preferred mode, light 512 is used as filtered light 114 shown in FIG. 1.

Filter 500 in FIG. 5D is shown diffracting all visible components of collimated light 112. This operational mode of filter 500 may result in response to filter 500 receiving the first set of control signals or the new first set of control signals during the first stage of the three stage cycle described above. The magnitudes of the first set of control signals and the new first set of control signals in this mode of operation are distinct from the first set of control signals and the new first set of control signals provided to reflective type filter 500 operating in the additive mode described above. In the subtractive mode of operation, the second or the updated second red bandwidth control signal is applied to the ITO layers of electrically switchable holographic optical element 502R while the first green and blue bandwidth control signals are applied to the ITO layers of electrically switchable holographic optical elements 502G and 502B, respectively. In this mode, the first green and blue bandwidth control signals completely activate electrically switchable holographic optical elements 502G and 502B, respectively. In a preferred embodiment, light 512 constitutes filtered light 114 shown in FIG. 1, and the second or updated second red bandwidth control signals are generated by feedback system 110 in order to maintain light 512 (or filtered light 114) at the first predetermined intensity.

Filter 500 in FIG. 5D may also operate in the subtractive mode to diffract all or substantially all of the red and blue bandwidth components of collimated light 112 into first order diffracted components while diffracting the green bandwidth component of collimated light 112 into zero order and first order diffracted components in response to filter 500 receiving the second set of control signals or the new second set of control signals during the second stage of the three stage cycle described above. Additionally, filter 500 of FIG. 5D may also operate in the subtractive mode to diffract all or substantially all of the red and green bandwidth components of collimated light 112 into first order diffracted components while diffracting the blue bandwidth component of collimated light 112 into zero order and first order diffracted components in response to filter 500 receiving the third set of control signals or the new third set of control signals during the third stage of the three stage cycle described above.

Figure 6:
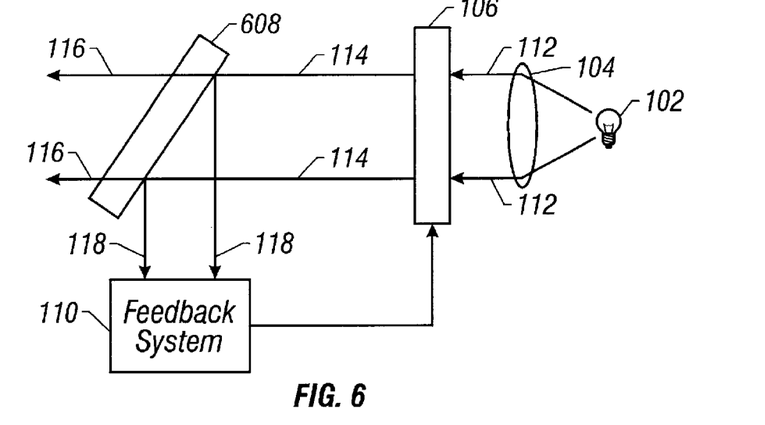
FIG. 6 illustrates one embodiment of the illumination system shown in FIG. 1.
Figure 7:
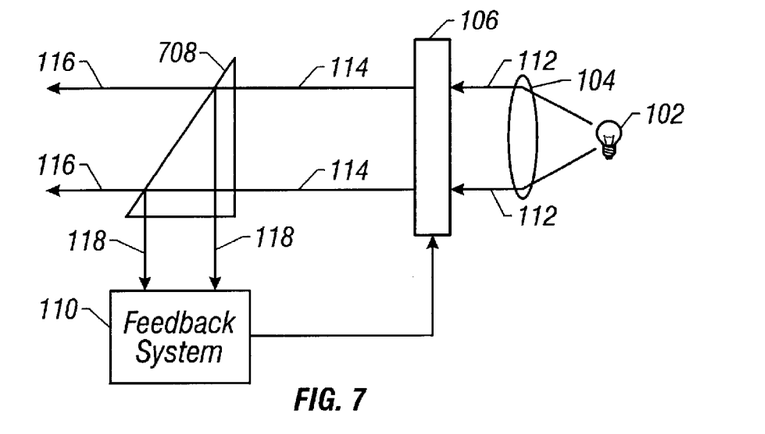
FIG. 7 illustrates another embodiment of the illumination system shown in FIG. 1.

FIGS. 6 and 7 show alternative embodiments of the system shown in FIG. 1. In FIG. 6, deflector 108 of FIG. 1 takes form in beam splitter 608. In FIG. 7, deflector 108 of FIG. 1 takes form in prism 708. A beam splitter or prism could also be employed as deflector 108 in the system shown in FIG. 2. The deflector would use multilayer coatings to reflect some specified small portion of the incident light.

Figure 8:
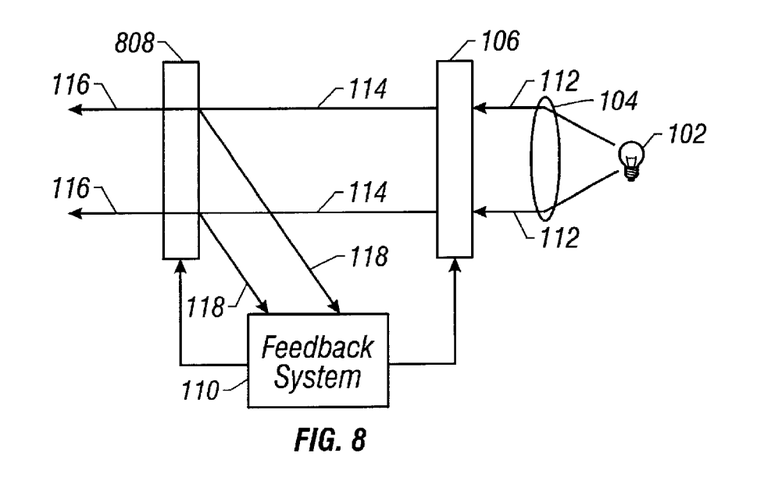
FIG. 8 illustrates yet another embodiment of the illumination system shown in FIG. 1.
Figure 9:
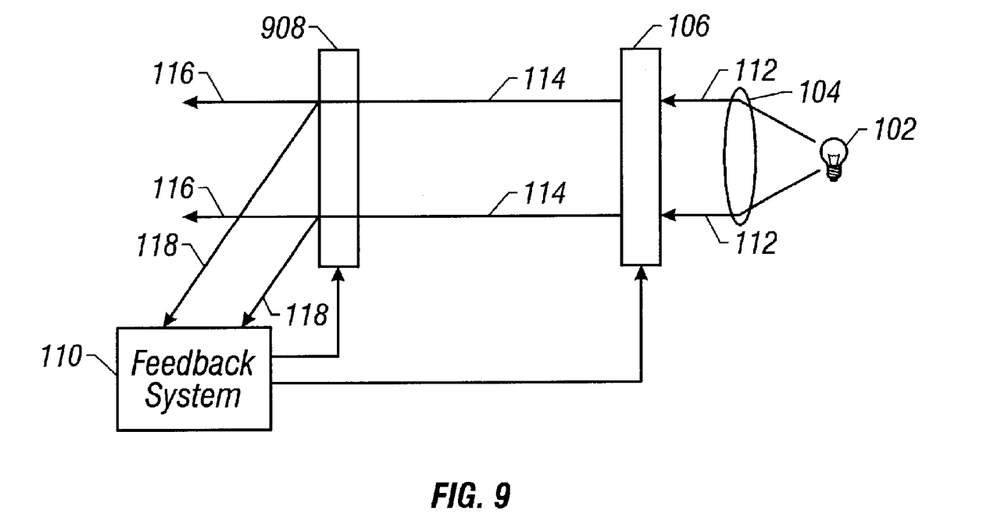
FIG. 9 illustrates still another embodiment of the illumination system shown in FIG. 1.

FIGS. 8 and 9 show alternative embodiments of the illumination system shown in FIG. 1 in which deflector 108 takes form in one or more electrically switchable holographic optical elements. In FIG. 8, the deflector 108 of FIG. 1 is embodied in one or more transmissive electrically switchable holographic optical elements 808. In FIG. 9, the deflector 108 in FIG. 1 takes form in one or more reflective electrically switchable holographic optical elements 908. Each of the one or more transmissive or reflective electrically switchable holographic optical elements shown in FIGS. 8 or 9 may be controlled by feedback system 110 properly extended.

In one embodiment, deflectors 808 and or 908 include three distinct electrically switchable holographic optical elements each one of which is individually operable to diffract one of the red, green, and blue bandwidths of filtered light 114 incident thereon. In other words, one of the electrically switchable holographic optical elements in deflectors 808 or 908, when operating in the active state, diffracts red, blue, or green bandwidth components of light 114 while transmitting the remaining portions filtered light 114 without substantial alterations. In FIGS. 8 and 9, filtered light 114 which is subsequently diffracted by deflector 808 or 908, falls incident on feedback control system 110. The remaining components of filtered light 114 that pass through deflector 808 or 908 without substantial alteration emerge therefrom as illumination light 116. In FIGS. 8 and 9, deflectors 808 and 908 are controlled by feedback system 110. The deflectors 808 and 908 shown in FIGS. 8 and 9 could be employed in similar fashion in the reflective type system shown in FIG. 2.

Figure 10:
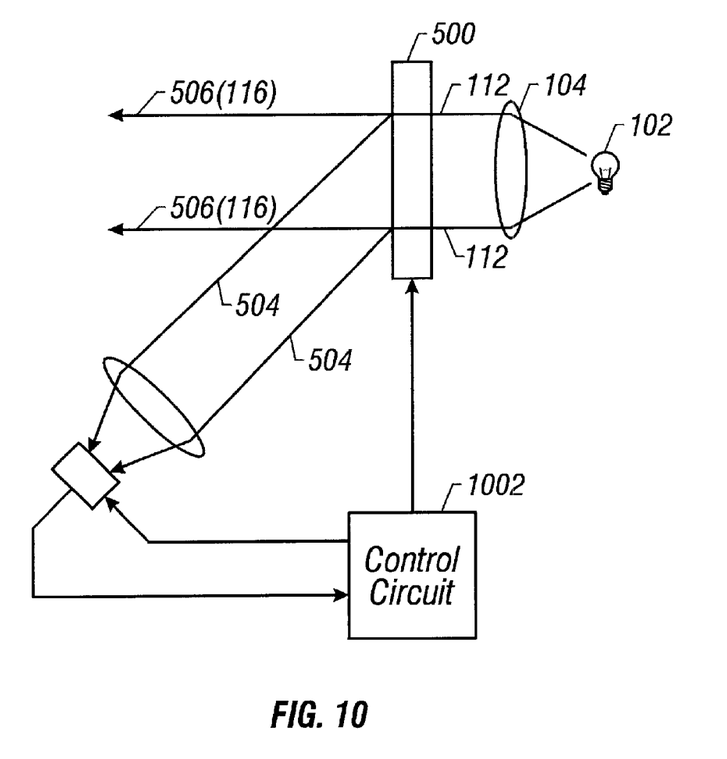
FIG. 10 is a block diagram of an illumination system according to still another embodiment of the present invention.

FIG. 10 shows an alternative embodiment of the system shown in FIG. 1 using the filter 500 shown in FIG. 5. In FIG. 10, control circuit 1002 operates filter 500 between a sample mode and an illumination mode. In the illumination mode, control circuit 1002 generates control signals which operate filter 500 in the subtractive mode shown in FIG. 5B. In the illumination mode, zero order diffracted light 506 is used as illumination light 116. However, in the sample mode, control circuit 1002 operates filter 500 in the additive mode shown in FIG. 5A. In the sample mode, circuit 1002 samples and compares the intensity of first order diffracted component 504 to one or more predetermined value. A variation in intensity between diffracted component 504 and the one or more predetermined values causes circuit 1002 adjust the control signals provided to filter 500 when filter 500 operates in the illumination mode.

The illumination systems described above may have a number of applications. For example, it could be used to control color balance by compensating for color changes arising from light source temperature variation and color shift due to aging.

What is claimed is:

1. An apparatus comprising:
    an electrically controllable optical filter comprising an electrically switchable holographic optical element, wherein the electrically switchable holographic optical element is switchable between active and inactive states, wherein the electrically switchable holographic optical element is configured to receive incident light and one or more control signals, wherein the electrically switchable holographic optical element outputs light in response to receiving the incident light and the one or more control signals, wherein the output light comprises only a portion of the incident light, wherein the portion of incident light varies according to the one or more control signals received by the electrically switchable holographic optical element;
    a light detector, wherein the light detector is configured to detect a portion of output light, wherein the light detector is configured to generate an output signal in response to detecting the portion of output light, and;
    a control signal circuit coupled between the light detector and the electrically switchable holographic optical element, wherein the control signal circuit is configured to generate the one or more control signals in response to the light detector generating the output signal.

2. The apparatus of claim 1 wherein the portion of the incident light varies in accordance with a magnitude of one or more of the control signals.

3. The apparatus of claim 1 wherein the electrically controllable optical filter comprises an electrically switchable liquid crystal optical element.

4. The apparatus of claim 1 wherein the electrically switchable holographic optical element comprises a holographic recording medium that records a hologram, wherein the holographic recording medium comprises:
    a monomer dipentaeryiritol hydroxypentaacrylate;
    a liquid crystal;
    a cross-linking monomer;
    a coinitiator; and
    a photoinitiator dye.

5. The apparatus of claim 1 wherein the electrically switchable holographic optical element comprises a hologram made by exposing an interference pattern inside a polymer-dispersed liquid crystal material, the polymer dispersed liquid crystal material comprising, before exposure:

a polymerizable monomer;
a liquid crystal;
a cross-linking monomer;
a coinitiator; and
a photoinitiator dye.

6. The apparatus of claim 1 further comprising a beamsplitter configured to receive and deflect the portion of the output light, wherein the light detector detects the portion of the output light after being deflected by the beamsplitter.

7. The apparatus of claim 6 further comprising a collection lens positioned between the beamsplitter and the light detector, wherein the collection lens is configured to receive and collect the portion of the output light after being deflected by the beamsplitter, wherein the light detector detects the portion of output light after being collected by the collection lens.

8. The apparatus of claim 1 further comprising a condenser lens, wherein the condenser lens is configured to collimate the incident light before the electrically controllable optical filter receives the incident light.

9. The apparatus of claim 1 wherein the portion of incident light varies by intensity.

10. The apparatus of claim 1 wherein the portion of incident light varies by bandwidth.

11. The apparatus of claim 1 wherein the portion of incident light varies by intensity and bandwidth.

12. The apparatus of claim 1 further comprising a digital reflective display, wherein the digital reflective display is configured to receive a portion of the output light.

13. The apparatus of claim 1 further comprising an array of switchable micro-mirrors wherein the array of switchable micro-mirrors is configured to receive a portion of the output light.

14. The apparatus of claim 1:
wherein the electrically controllable optical filter is configured to receive a first set of control signals, wherein the output light comprises only a first bandwidth portion of the incident light, wherein the first bandwidth portion of incident light varies in intensity according to the first set of control signals received by the electrically controllable optical filter;
wherein the electrically controllable optical filter is configured to receive a second set of control signals, wherein the output light comprises only a second bandwidth portion of the incident light, wherein the second bandwidth portion of incident light varies in intensity according to the second set of control signals received by the electrically controllable optical filter;
wherein the electrically controllable optical filter is configured to receive a third set of control signals, wherein the output light comprises only a third bandwidth portion of the incident light, wherein the third bandwidth portion of incident light varies in intensity according to the third set of control signals received by the electrically controllable optical filter;
wherein the first, second, and third bandwidths are distinct from each other.

15. The apparatus of claim 14:
wherein the first bandwidth portion of incident light varies in intensity according to one of the first set of control signals received by the electrically controllable optical filter;
wherein the second bandwidth portion of incident light varies in intensity according to one of the second set of control signals received by the electrically controllable optical filter;
wherein the third bandwidth portion of incident light varies in intensity according to one of the third set of control signals received by the electrically controllable optical filter.

16. The apparatus of claim 14:
wherein the first bandwidth portion of incident light varies in intensity according to a magnitude of one of the first set of control signals received by the electrically controllable optical filter;
wherein the second bandwidth portion of incident light varies in intensity according to a magnitude of one of the second set of control signals received by the electrically controllable optical filter;
wherein the third bandwidth portion of incident light varies in intensity according to a magnitude of one of the third set of control signals received by the electrically controllable optical filter.

17. The apparatus of claim 14 wherein the electrically controllable optical filter is configured to diffract the incident light received thereon.

18. The apparatus of claim 17 wherein the output light comprises only a diffracted portion of the incident light.

19. The apparatus of claim 14 wherein the electrically controllable optical filter is configured to sequentially and cyclically receive the first, second, and sets of control signals.

20. The apparatus of claim 1 wherein the electrically controllable optical filter comprises a first holographic optical element having front and back oppositely facing surfaces, wherein the first holographic optical element is switchable between active and inactive states, wherein the first optical element diffracts first bandwidth light incident on the front surface thereof when operating in the active state, wherein the first bandwidth light diffracted by the first holographic optical element emerges from the back surface thereof, and wherein the first holographic optical element transmits first bandwidth light without substantial alteration when operating in the inactive state.

21. The apparatus of claim 20 wherein the electrically controllable optical filter comprises a second holographic optical element having front and back oppositely facing surfaces, wherein the second holographic optical element is switchable between active and inactive states, wherein the second holographic optical element diffracts second bandwidth light incident on the front surface thereof when operating in the active state, wherein second bandwidth light diffracted by the second holographic optical element emerges from the back surface thereof, and wherein the second holographic optical element transmits second bandwidth light without substantial alteration when operating in the inactive state, wherein the first and second holographic optical elements are positioned adjacent each other, and wherein first and second bandwidth lights are distinct from each other.

22. The apparatus of claim 21 wherein the front surfaces of the first and second holographic optical elements are aligned orthogonal to a common axis so that the back surface of the first holographic optical element faces the front surface of the second holographic optical element.

23. The apparatus of claim 22 further comprising a polarization rotation device positioned between the first and second holographic optical elements, wherein each of the first and second holographic optical elements comprise a diffraction grating, wherein the first and second holographic optical elements are configured so that the diffraction gratings thereof are disposed parallel to each other.

24. The apparatus of claim 22 wherein the first holographic optical element comprises a first diffraction grating, wherein the second holographic optical element comprises a second diffraction grating, and wherein the first diffraction grating is disposed orthogonal to the second diffraction grating.

25. An apparatus comprising:
   an electrically controllable optical filter configured to receive incident light and one or more control signals, wherein the electrically controllable optical filter outputs light in response to receiving the incident light and the one or more control signals, wherein the output light comprises only a portion of the incident light, wherein the portion of incident light varies according to the one or more control signals received by the electrically controllable optical filter;
   a light detector, wherein the light detector is configured to detect a portion of output light, wherein the light detector is configured to generate an output signal in response to detecting the portion of output light, and;
   a control signal circuit coupled between the light detector and the electrically controllable optical filter, wherein the control signal circuit is configured to generate the one or more control signals in response to the light detector generating the output signal;
   a first group of first, second, and third holographic optical elements electrically switchable between active and inactive states;
   a second group of first, second, and third holographic optical elements electrically switchable between active and inactive states;
   wherein each holographic optical element comprises front and back oppositely facing surfaces;
   wherein each of the first holographic optical elements diffracts first bandwidth light incident on the front surface thereof when operating in the active state, wherein first bandwidth light diffracted by each of the first holographic optical elements emerges from the back surface thereof, and wherein each of the first holographic optical elements transmits first bandwidth light incident on the front surface thereof without substantial alteration when operating in the inactive state, wherein first bandwidth light transmitted by each of the first holographic optical elements emerges from the back surface thereof;
   wherein each of the second holographic optical elements diffracts second bandwidth light incident on the front surface thereof when operating in the active state, wherein second bandwidth light diffracted by each of the second holographic optical elements emerges from the back surface thereof, and wherein each of the second holographic optical elements transmits second bandwidth light incident on the front surface thereof without substantial alteration when operating in the inactive state, wherein second bandwidth light transmitted by each of the second holographic optical elements emerges from the back surface thereof;
   wherein each of the third holographic optical elements diffracts third bandwidth light incident on the front surface thereof when operating in the active state, wherein third bandwidth light diffracted by each of the third holographic optical elements emerges from the back surface thereof, and wherein each of the third holographic optical elements transmits third bandwidth light incident on the front surface thereof without substantial alteration when operating in the inactive state, wherein third bandwidth light transmitted by each of the third holographic optical elements emerges from the back surface thereof;
   wherein the first and second groups of holographic optical elements are positioned adjacent each other;
   wherein the first, second and third bandwidths are distinct from each other.

26. The apparatus of claim 25 wherein the front surface of each holographic optical element is aligned orthogonal to a common axis, wherein the front surfaces of each of the holographic optical elements of the second group faces the back surface of each of the holographic optical elements of the first group.

27. The apparatus of claim 26 further comprising a polarization rotation device positioned between the first and second groups of holographic optical elements, wherein each of the holographic optical elements comprises a diffraction grating, wherein all the holographic optical elements are positioned so that each diffraction grating is disposed parallel to the others.

28. The apparatus of claim 26 wherein each of the holographic optical element of the first group comprises a first grating, wherein the each of the second holographic optical elements of the second group comprises a second grating, and wherein the first and second groups of holographic optical elements are positioned so that the first gratings are disposed orthogonal to the second gratings.

29. The apparatus of claim 1 wherein the electrically controllable element comprises a fist holographic optical element having front and back oppositely facing surfaces, wherein the first holographic optical element is switchable between active and inactive states, wherein the first optical element diffracts first bandwidth light incident on the front surface thereof when operating in the active state, wherein first bandwidth light diffracted by the first holographic optical element emerges from the front surface thereof, and wherein the first holographic optical element transmits first bandwidth light incident on the front surface thereof without substantial alteration when operating in the inactive state.

30. The apparatus of claim 29 wherein the electrically controllable element comprises a second holographic optical element having front and back oppositely facing surfaces, wherein the second holographic optical element is switchable between active and inactive states, wherein the second holographic optical element diffracts first bandwidth light incident on the front surface thereof when operating in the active state, wherein first bandwidth light diffracted by the second holographic optical element emerges from the front surface thereof, and wherein the second holographic optical element transmits first bandwidth light without substantial alteration when operating in the inactive state, wherein the first and second holographic optical elements are positioned adjacent each other.

* * * * *